E. SWAIN.
Wheel Tightener.

No. 73,668. Patented Jan. 21, 1868.

Witnesses:

Inventor:

UNITED STATES PATENT OFFICE.

ENOCH SWAIN, OF LEWISTOWN, PENNSYLVANIA.

IMPROVEMENT IN WHEEL-TIGHTENERS.

Specification forming part of Letters Patent No. 73,668, dated January 21, 1868.

*To all whom it may concern:*

Be it known that I, ENOCH SWAIN, of Lewistown, Mifflin county, Pennsylvania, have invented a new and Improved Mode of Fastening the Tire to the Wheel of any Vehicle; and I do hereby declare that the following is a full, clear, and exact description of the construction and operation of the same, reference being had to the annexed drawings, making a part of this specification, in which—

Figure 1:
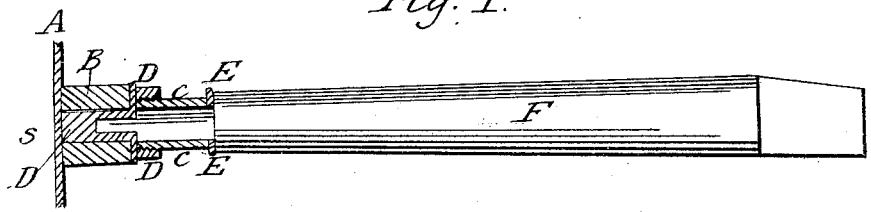
Figure 2:
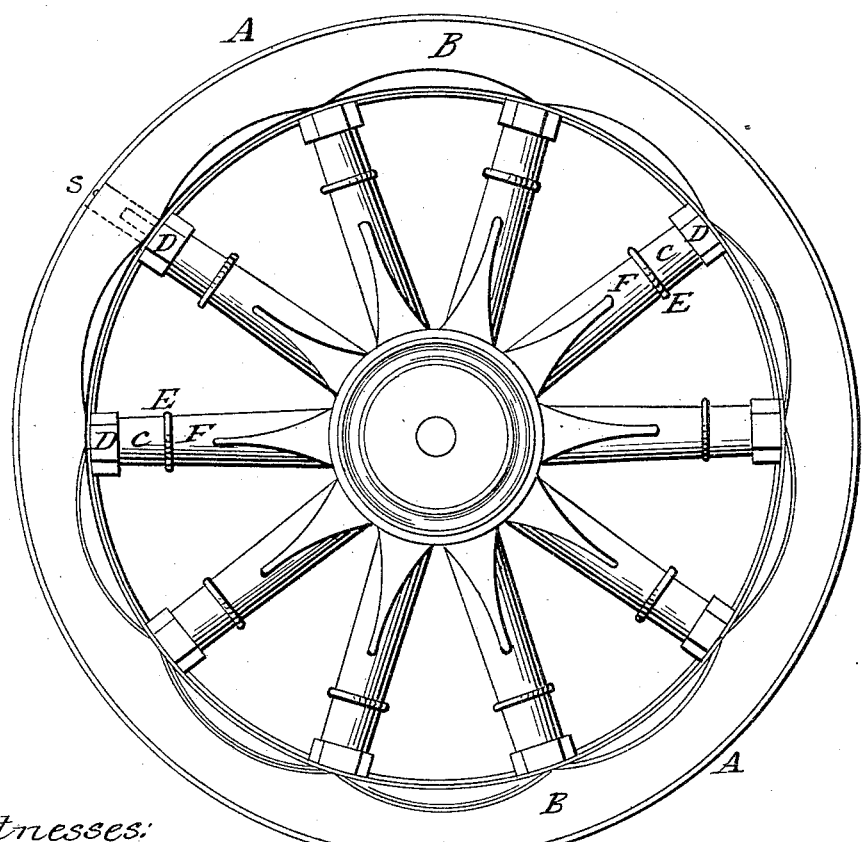

Figure 1 represents a cross-section of a spoke. Fig. 2 represents front view of wheel.

The object of my invention consists in fastening the tire of a wheel to the felly, when required, with ease, in a very short time, and without the removal of the wheel from the carriage.

To effect this, in Figs. 1 and 2, let A represent the tire, with a groove, $s$, about one-eighth of an inch in depth and width, B the felly, C a female screw, D a cylinder, with a screw on outside, E a washer, and F a spoke of the wheel.

The spokes of the wheel are cut with a shoulder, forming a tenon, over which the washer E and male screw D are placed. The female screw C is made with a closed end and projecting iron end, G, passing through the felly, and entering the groove $s$ about one-eighth of an inch.

The mode of operation consists in turning the screw C with a wrench, by which the tire can be tightened or loosened in a few moments, without the necessity of removing the wheel from the carriage; and the projection G in the groove $s$ obviates the use of bolts in securing the tire to the felly.

What I claim as my invention, and desire to secure by Letters Patent, is—

The combination of the circumferential grooved tire $s$ with the screws C D and spoke, constructed as described, for the purposes set forth.

ENOCH SWAIN.

Witnesses:
C. M. ALEXANDER,
J. M. MASON.